Dec. 6, 1966  C. E. VAN DER SMISSEN  3,290,118
APPARATUS FOR DETECTING PHOSPHORUS AND/OR SULPHUR IN GASES
Original Filed Jan. 10, 1962
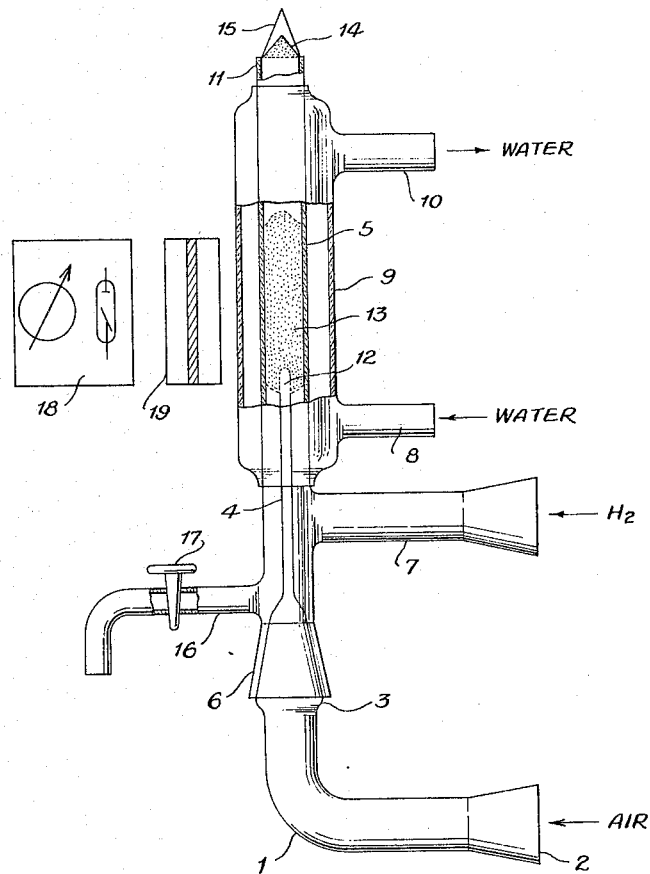
INVENTOR
Carl Ernst van der Smissen
BY
Bailey, Stephens and Huettig
ATTORNEYS

United States Patent Office 3,290,118
Patented Dec. 6, 1966

3,290,118
APPARATUS FOR DETECTING PHOSPHORUS AND/OR SULPHUR IN GASES
Carl Ernst van der Smissen, Hamburg-Rahlstedt, Germany, assignor to Otto Heinrich Drager, Lubeck, Germany
Original application Jan. 10, 1962, Ser. No. 165,543, now Patent No. 3,213,747, dated Oct. 26, 1965. Divided and this application June 2, 1965, Ser. No. 474,195
Claims priority application Germany, Jan. 19, 1961, D 35,201
4 Claims. (Cl. 23—253)

This is a division of my application S.N. 165,543, filed Jan. 10, 1962, for "Process for Detecting Phosphorus and/or Sulphur in a Gas," now Patent No. 3,213,747.

This invention relates to the detection of the presence of phosphorus and/or sulphur containing compounds in air or other gases.

In particular, this invention is directed to the process for the quantitative determination of phosphorus or sulphur containing compounds by means of the coloration of a hydrogen flame. In this invention, the gas to be analyzed either contains oxygen or oxygen is added thereto, and then the gas is mixed with hydrogen, with the amount of hydrogen being in excess of that required for the complete reaction of the oxygen contained in the gas. Finally, the mixture of gas with oxygen is ignited to obtain a color produced by the resulting flame. The invention has the advantage of giving a great sensitivity of detection.

In a modified form of the invention, if the gas to be analyzed does not contain oxygen, a separate oxygen stream is introduced into the hydrogen stream along with the gas to be analyzed. In this mixture, the quantity of hydrogen is again greater than that needed for the complete reaction of the oxygen. This modification is also of great sensitivity for detecting the presence of phosphorus or sulphur in the gas.

The means by which the objects of the invention are obtained are described more fully with reference to the accompanying schematic drawing of the apparatus used.

The burner is composed of two parts. The first part is a quartz tube 1 having inlet 2 for the gas to be tested and a conical portion 3 drawn out into a fine bore tube 4, the upper end of which is open. Tube 4 is partially telescoped within a quartz, Pyrex or high temperature resistant glass tube or cylinder 5, the lower end 6 of which is seated on the conical portion 3. Hydrogen is introduced adjacent the lower end of tube 5 through inlet pipe 7. Tube 5 is cooled by a cooling agent such as water entering pipe 8 into water jacket 9 which surrounds tube 5, the cooling agent being exhausted through pipe 10. The upper end 11 of tube 5 is an external burner tube for the formation of an upper flame, while a lower first flame 12 is formed at the outlet end of tube 4 and this flame produces a glow zone 13.

In operation, the gas such as air containing either phosphorus or sulphur compounds flows through into inlet 2 of pipe 1 and through tube 4. At the same time, hydrogen enters through pipe 7. The velocity of the air in pipe 1 is about from 0.3 to 0.6 liter per minute and the velocity of the hydrogen is from about 0.1 to 0.4 liter per minute. The hydrogen is ignited at the upper end 11, and the flame strikes back to ignite the first lower flame 12. Tube 5 is cooled by the water jacket 9 and intense cooling causes the water formed by the flame 12 to collect on the inner wall of tube 5, which water drops to the drain pipe 16 closed by the stopcock 17. When the gas being tested is free from sulphur and phosphorus compounds, the flame 12 is bluish-white. This flame 12 has about the diameter of tube 4 and a length of from about 3 to 5 mm. It has a type of semi-circular to elliptical shape. The upper flame has an inner coloration 14 and an outer conical shape 15. In the absence of phosphorus or sulphur, it has only a slight bluish, reddish, or yellowish glow depending upon the color of the glass tube 5.

When the gas being tested contains phosphorus compounds, the flame 12 has an intensified whitish coloration and the edge of flame 15 is colored somewhat whitish to yellowish. In the glowing zone 13 above flame 12, a green color appears at a distance of from about one to two times the length of flame 12 above the top of flame 12 and which has a decreased intensity in an upward direction. This green coloration appears a second time at the end 11 of tube 5 in the form of a very sharply defined cone 14 within flame 15.

When the gas being tested contains a sulphur compound, no change occurs in the coloration of flames 12 and 15. However, a bluish coloration appears in the glow zone 13 instead of the greenish phosphorus color. This bluish color appears somewhat higher above the tip of flame 12 than the green phosphorus color. Again, cone 14 in flame 15 has a blue sulphur color instead of the green phosphorus color.

When both phosphorus and sulphur compounds are found in the gas being tested, a blue color appears above a green color in the glow zone 13. The cone 14 is colored either blue or green according to the preponderance of either sulphur or phosphorus compounds in the gas.

The colors were determined in zone 13 with the aid of a spectrophotometer 18. The green phosphorus color was measured on the 520 millimicron line, and the blue sulphur color was measured on the 380 millimicron line. The colors in cone 14 can be determined in a like manner. According to the concentration of either phosphorus or sulphur in an amount of about $10^{-6}$ grams per liter of air, the characteristic glow of both flames 12 and 13 is substantially unaffected by slight changes in the intensity of flame 12. Therefore, both colored zones 13 and 14 are well suited for measuring purposes. When the concentration drops to about $10^{-8}$ grams per liter of air, the intensity of the color is determined by the first or lower flame 12. This concentration is very sensitive to the fluctuations of the quantities of air and hydrogen so that it is not constant with a change in the intensity of flame 12 at the maximum sensitivity obtainable. Therefore, only the glowing zone 13 between flames 12 and 15 is usable. The optical axis of the spectrophotometer was set to transverse tube 5 about from five to fifteen times the length of flame 12 above flame 12 for measuring the blue sulphur coloration. When measuring the green phosphorus color, the axis was positioned from about one to two times the length of flame 12 above flame 12.

The size of the burners can be selected to give the velocity of the gas and hydrogen flows as required. The water jacket 9 can be replaced by air cooling, and also the flame temperatures can be lowered by diluting the combustion gases with nitrogen or other inert gas. By setting the spectrophotometer upon the corresponding two wave lengths, namely 520 and 380 millimicrons, the combined presence of both phosphorus and sulphur can be determined. Also, the determination can be carried out at other wave lengths since the spectral bands employed are wide and the given wave lengths of 520 and 380 millimicrons designate only the sharpest lines. The detection of phosphorus or sulphur in air is shown by the following example.

The air to be tested and suspected of containing a phosphorus compound, such as tricresyl phosphate, phosphorus oxychloride and sulphur compounds such as sulphur dioxide, dimethyl sulfoxide or thiophene, was introduced through tube 1 and the hydrogen was introduced through tube 7. The gas mixture was ignited in the burner tip 11. Thereupon, the flame struck back and ignited the lower or first flame 12 inside tube 5. The water cooling was turned on and the spectrophotometer 18 set to the readings on the wave lengths 520 and 380 millimicrons. The optical axis of the photometer was set to be selectively centered at either from about one or two times or from five to fifteen times the length of flame 12 above flame 12.

When only a few micrograms of phosphorus or sulphur containing compounds were in a cubic meter of air, the photometer showed the presence of a distinct color in the glow zone 13, this color being green for phosphorus and blue for sulphur. The observation of a specific color was facilitated by using a light filter 19 which filtered only pure green light for the phosphorus observation and a pure blue light for the sulphur observation.

Having now described the means by which the objects of the invention are obtained, I claim:

1. An apparatus for detecting the presence of phosphorus or sulphur compounds in a gas comprising a high temperature-resistant transparent cylinder for containing gas, a fine bore glass burner tube partially telescoped within said cylinder through an opening in said cylinder sealed against the entry of air, means for introducing the gas into said burner tube and directly into said cylinder, and means for introducing hydrogen directly into said cylinder as a fuel for mixing with said gas and forming a glow zone in said cylinder from the flame produced thereby.

2. An apparatus as in claim 1, further comprising a cooling jacket surrounding said cylinder.

3. An apparatus as in claim 2, further comprising a spectrophotometer mounted adjacent said cylinder for determining the presence of phosphorous in the range of about 520 millimicrons, and the presence of sulphur in the range of about 380 millimicrons.

4. An apparatus as in claim 2, further comprising a light filter mounted between a photometer and said gas cylinder for transmitting light only in the range of about 520 millimicrons when detecting for phosphorous, and of about 380 millimicrons when detecting for sulphur.

References Cited by the Examiner

UNITED STATES PATENTS

| | | | |
|---|---|---|---|
| 2,200,523 | 5/1940 | Tuel | 23—254 |
| 2,589,116 | 3/1952 | Nolcken | 23—154 |
| 2,730,005 | 1/1956 | Vonnegut | 23—154 |
| 2,779,666 | 1/1957 | Anthes | 23—254 |
| 2,809,101 | 10/1957 | Mitchell | 23—254 |

OTHER REFERENCES

Wickbold, Angewandet Chemie, Jahrg. 69, pp. 530–533, 1957.

MORRIS O. WOLK, *Primary Examiner.*

Z. PAROCZAY, *Assistant Examiner.*